United States Patent [19]

Drury et al.

[11] 4,083,999

[45] Apr. 11, 1978

[54] TREATING ANIMAL FEEDSTUFFS WITH ANTI-FUNGAL SOLUTIONS OF SOLID ACIDS IN VOLATILE FATTY ACIDS

[75] Inventors: Emma-Jane E. Drury, Rochester; David C. Herting, Spencerport, both of N.Y.

[73] Assignee: Eastman Kodak Company, Rochester, N.Y.

[21] Appl. No.: 675,049

[22] Filed: Apr. 8, 1976

Related U.S. Application Data

[63] Continuation-in-part of Ser. No. 501,380, Aug. 28, 1974, abandoned, which is a continuation of Ser. No. 306,758, Nov. 15, 1972, abandoned.

[51] Int. Cl.$^2$ ............................................. A23L 3/24
[52] U.S. Cl. ................................... 424/317; 426/532
[58] Field of Search ............... 424/317; 426/331, 335, 426/532

[56] References Cited

U.S. PATENT DOCUMENTS

| 2,722,483 | 11/1955 | Winkler | 424/317 |
| 2,856,294 | 10/1958 | Brown | 426/582 X |
| 2,910,367 | 10/1959 | Melnick | 426/532 |
| 3,021,219 | 2/1962 | Melnick | 426/310 |
| 3,798,321 | 3/1974 | Nelson | 424/317 X |

FOREIGN PATENT DOCUMENTS

2,041,781   2/1972   Germany.

OTHER PUBLICATIONS

Preonas et al.; Growth of *Staphylococcus aureus* MF31 on the Top and Cut Surfaces of Southern Custard Pies, Applied Microbiology, July 1969, pp. 68–75.

*Primary Examiner*—Joseph M. Golian
*Attorney, Agent, or Firm*—John F. Stevens; Daniel B. Reece, III

[57] ABSTRACT

Animal feeds are treated with a fungicidal solution comprising a synergistic blend of sorbic and/or dehydroacetic acid and at least one fatty acid selected from acetic, propionic and butyric acids.

3 Claims, No Drawings

TREATING ANIMAL FEEDSTUFFS WITH ANTI-FUNGAL SOLUTIONS OF SOLID ACIDS IN VOLATILE FATTY ACIDS

This is a continuation-in-part of application Ser. No. 501,380, filed Aug. 28, 1974, now abandoned, which is a continuation of application Ser. No. 306,758 filed Nov. 15, 1972, now abandoned.

This invention relates to anti-fungal solutions of solid acids dissolved in volatile fatty acids and more particularly relates to anti-fungal solutions of sorbic and dehydroacetic acids dissolved in a volatile fatty acid having from 2 to 4 carbon atoms.

Deterioration and loss of various grain, oil seeds, and other feedstuffs is one of the most serious economic problems in the world today. The Food and Agricultural Organization, United Nations, estimated that 5% of all food grains harvested are lost before consumption. The World Health Organization has indicated the magnitude of the problem by quoting 20% post-harvest loss in Africa, Asia and Latin America, and 15% loss in the near East where spoilage in some areas affected 50% of the food in storage. Estimates of the amount lost due to deterioration resulting from fungi range from 0.5–10% of the world's production of grain. A solution to this problem of storage deterioration would affect significantly the world-wide shortage of food that presently exists.

Although these high losses are generally restricted to the less developed nations, which coincidentally are often in the temperate climates that favor fungal growth, significant economic losses also occur in the more developed nations such as the United States. Estimates of losses probably due to fungal damage in government or commercial warehouses range from about 0.5% of the soybeans to about 2% of the corn with a total value of $96,000,000.00. Farm storage losses are higher and range from 4.5% for wheat, oats, rye, barley and rice to 6.0 percent for corn and grain sorghum with a total value of $262,000,000.00. Though hay is somewhat less valuable than grains and oil seeds, losses are somewhat higher at 5% in commercial storage and 7% during farm storage.

Most of the damage to grain results from fungi which invade the grain after harvesting. The storage fungi comprise about a dozen species of Aspergillus, several species of Penicillium, a single species of Sporendonema and possibly a few species of yeast. Within the last decade, an increased awareness and understanding of a health hazard associated with the fungi has also come about. Under appropriate conditions, molds often produce mycotoxins, of which the best known one is aflatoxin from Aspergillus Flavus. These toxins are of increasing concern because they are harmful to many domesticated animals, will produce hepatic cancer in at least several species, including rats and have been implicated with cirrhosis in children.

Key factors favoring the growth of mold are moderate temperatures and a high relative humidity. The length of time feedstuff is stored and the degree to which it is invaded by storage fungi are also important. Other factors such as presence of foreign material or fines and infestation by insects or mites may accelerate the process. For centuries man has attempted to minimize the influence of these factors with only minor success. Storage losses cited earlier demonstrate that even practices of more advanced agricultural societies have not achieved complete success.

The traditional approach in the United States has been to field dry crops as long as possible and then, after harvesting, to dry further if necessary to the moisture level presumed safe for storage. Some crops such as wheat or oats with shorter growing seasons and with earlier harvesting dates are more suitable for field drying than a crop such as corn which matures later. For any crop, however, these practices result in a relative flood of grain to be dealt with in a short span of time. When the weather is not cooperative, the grain is wetter than usual. Indeed, the farmer may be fortunate to be able to harvest the crop. While literally mountains of grain accumulate to await commercial drying, molding and heating can begin within 24 hours.

These problems are particularly acute with corn, the principal grain crop and animal feed in the United States. In recent years the problems have been accentuated by the development of highly mechanized, efficient harvesting systems such as the picker-sheller. Although these systems increase the recovery of corn and spread the harvesting season over a longer period of time, they require at least 23% moisture in the grain for maximum effectiveness and thus compound the problem by producing more grain with high levels of moisture.

The basic way for preserving these grains has been drying, either by natural ventilation such as in crib storage or by forced aeration, using either air at ambient temperature or air with supplemental heat in bin dryers, portable batch dryers, or continuous flow dryers. Artificial drying has permitted earlier harvest, better planning, long term storage and generally better quality.

When "hot spots" develop or mold is observed during storage the grain may be re-dried. More frequently, however, the grain is blended out with sound grains or is "turned" either manually or by passing through an auger. The abrasion of such mechanical handling will break up "hot spots" and usually obscure the fact that mold has been growing but such measures are only temporary and do not stop mold growth.

The crop losses cited earlier testify that the present practices for preserving feedstuffs are not completely effective. Natural drying depends on the whims of weather. When crops are harvested wet, losses may be unavoidable simply because dryers are either not available or their capacity is insufficient to handle the amount of grain and hay being dried. In other cases, the loss is due to carelessness in not drying sufficiently. Even drying of crops to moisture levels presumed safe for storage is no guarantee because diurnal temperature variations and other factors such as localization of fines may cause moisture migration within storage bins resulting in localized spots of ideal conditions for mold growth. Overdrying grain decreases the influence of the moisture factor for fungi but the resultant brittleness and cracking of the grain increase susceptibility to fungi, reduce grade, and decrease acceptability by the food processor.

With grain, two other aspects of handling assume great importance and both are more or less encouraged by the official grain standards. The principal commercial classification of the corn, for example, is grade 2 for which an allowable maximum of 15.5% moisture is permitted. Because the pricing of the corn is based on this moisture level, moisture is worth money and every effort is made to keep the moisture content as close as possible to this level without exceeding it. However, the maximum allowable moisture content for grains and feeds of the most common grade exceeds by several percent the maximum moisture content that will permit safe storage for periods of time of a year or more. Since removal of this additional water is not only costly, but also results in shrinkage of weight without any compensatory increase in value, the grain processor tends to take his chances on storage losses.

A second practice in grain handling is co-mingling of grains. Grain that for any reason contains less than the allowable maximum moisture content can be mixed with grain containing higher than allowable moisture content so long as the average moisture content in the co-mingled grain meets the grain standards. Although this is legal, this practice permits a substrate that is more favorable to fungal growth than if every grain kernel were dried to the specifications of the grain standard.

Recently, there has been interest expressed in the use of formic, acetic, and propionic acids singly or in mixture for treating crops. This interest is exemplified by British Pat. Nos. 1,149,314 and No. 1,160,430; and U.S. Pat. Nos. 3,595,665 and 3,895,116.

In accordance with this invention it has been found that a solution of a solid acid dissolved in a volatile fatty acid having from 2 to 4 carbon atoms is a synergistically effective fungicide when added to grains and the like.

In accordance with this invention anti-fungal activity has been observed in a solution which contains from about 0.6 to 20% weight per volume of the solution or dilution of one of the solid acids, sorbic and dehydroacetic acids dissolved in a volatile fatty acid having from 2 to 4 carbon atoms. Where the solid acids are present in a mixture they constitute preferably about 2 to 20% weight per volume of the solution. The preferred ranges for single acids are: sorbic about 0.6–10% weight per volume, dehydroacetic about 0.6–20% weight per volume.

The solution utilized and the amount required depend on a number of factors including the moisture content of the material to be treated, the type of material to be treated, i.e. corn, wheat, and the like and the usual economic considerations.

These acid solutions may be applied by spraying the grain as it enters an auger or other conveying system being used to load feedstuffs into a storage area or by other techniques. Hay can be sprayed in the baling chamber, silage can be sprayed as it is chopped or as it is stored, or storage areas may be sprayed. Other application methods familiar to those skilled in the art may be used. The amount of anti-fungal solution to be added depends on a number of factors including the type of grain being treated, the amount of moisture in the grain, and the solution used. Anhydrous solutions of solid acids dissolved in volatile fatty acids have been found to have effective anti-fungal activity on 20% moisture content corn and wheat at levels of 0.26 ml. of acid solution or greater per 100 grams of grain.

The crops and animal feedstuffs which may be subjected to treatment with the acid solutions include for example corn, wheat, oats, soybeans, cottonseed meal, soybean meal, peanuts, barley, rye, hay, maize, silage, molasses feed, grain sorghum, safflower seeds, safflower meal, linseed meal, fishmeal, tankage, meat and bone meal or scrap, dried blood meal, feather meal, rapeseed, and rice.

The following Examples are further illustrative of the invention. In these Examples the effective fungicidal level (EFL) is expressed in terms of volume of solution or dilution per 100 grams of feedstuff and represents the lowest level of addition which inhibits mold growth. EFL is determined for corn and wheat in the following manner using what is known as a "miniature elevator" test.

Polyethylene wash bottles (1,000 ml. capacity) are filled with a predetermined amount of a test material and distilled water added to adjust the moisture content to the desired level. The bottles are capped, shaken, rotated and placed on their sides in a cold room at 4° C. for two days to equilibrate. During the equilibration period the bottles (hereinafter referred to as "elevators") are shaken and turned (still on theirs sides) 3 times daily. A representative composite sample of a few grains from each "elevator" in a given series is tested for moisture content before the test to determine the effective fungicidal level (EFL) is started. The tests are run in series of 12 "elevators" each plus a control "elevator" to which no acid solution is added. A predetermined amount of an acid solution or dry acid is added to the surface of the material to be tested in each test "elevator". The amount added is varied until EFL is determined as described hereinafter.

After adding the acid solution or dry acid each "elevator" is immediately capped to prevent the escape of acid, and is shaken and rotated vigorously. The caps are replaced by Bunsen valves and each series is set up in a warm room at 30° C. The dispenser tube on each "elevator", including the control, is connected to an air supply which is bubbled through distilled water at a rate of one liter per hour. The positive pressure insures an adequate air supply for maintaining the aerobic fungi in a high relative humidity atmosphere.

The incubation period for the "miniature elevator" test is seven days, after which the contents of the "elevator" are examined grossly and with a dissecting microscope. Duplicate sampling (about 20–30 kernels) of each grain from "top", "middle", and "bottom" of each "elevator" is plated on 10% salt-malt agar (Difco 0024 with 10% sodium chloride added) and incubated 48 hours at 30° C. and at greater than 70% relative humidity. The remaining contents of each elevator are then thoroughly mixed in a 6-inch by 9-inch procelain pan. Twenty kernels are selected at random, placed in 20 ml. distilled water in a 125 ml. Erlenmeyer flask, closed with a cotton plug and shaken four hours at room temperature (25° C.). Spore counts are done on a few drops of water from each flask by using a hemacytometer to count spores in the four corners and the middle square, as for a blood count. This method does not differentiate between living and dead spores and serves only as a guide to aliquot sizes to be taken from the distilled water for dilution in sterile water and subsequent plating on 10% salt-malt agar as modified from Buchanan and Gattani (E. D. Buchanan and R. E. Buchanan, "Bacteriology," MacMillen Co., New York (1936) p. 160 and M. L. Gattani, "Phytopathology" 44, pp. 113–115 (1954). These plates and the Erlenmeyer flask containing the grains with water are incubated 48 hours as are plates containing untreated samples of the material tested. After 48 hours the following steps are carried out.

1. The plated kernels are examined grossly for any mold growth.
2. The plated spore dilutions are examined grossly for any mold growth.
3. The Erlenmeyer flasks containing the material tested plus water are swirled and shaken and samples of water taken and placed on microscope slides. These water drops are examined microscopically. Five-hundred spores are counted under high-power magnification (× 430) and the percent of those germinating determined.

This test is important as it not only reveals spore germination but also yeast and bacterial inhabitation and/or growth. The plated kernels and plated spore solutions can be considered next in importance. Both show at a glance how well internal inoculum has been controlled. The gross examination of "elevators" shows only how well the external inoculum has been controlled. For example, an elevator can appear to be "mold free" by gross examination but this does not mean there has been a fungicidal action on the part of the anti-fungal until this finding is confirmed by a plating in the spore germination test. From an evaluation of these tests, the level of acid at which inhibition of storage fungi (97–100%) occurs is determined and recorded. If inhibition does not occur in the range tested, higher levels of acid are tested until inhibition does occur. The lowest level at which inhibition occurs is considered to be the effective fungicidal level (EFL).

In the table following "VFA" stands for volatile fatty acids. $C_2$ is acetic acid, $C_3$ is propionic acid, and $C_4$ is n-butyric acid.

The percentage of solid acid is expressed in weight per volume of the total acid solution. The percentage of VFA is expressed as a percentage of the volume of the volatile fatty acid or acids in which the solid acid is dissolved.

The expected EFL for various mixtures is determined by multiplying the percentage of each component contained in the solution times its individual EFL when used alone and then adding these expected contributions to obtain a total expected EFL. The expected EFL is then divided by the actual EFL observed and converted to percentage by moving the decimal point two places to the right. If the quotient obtained is greater than 100 when converted to a percent, then there is synergistic effect.

As a specific example of this method of determining synergistic effect, please refer to Example 12. Multiplying the percentage of butyric acid 94% (100% – 6%, the amount of sorbic acid in the total solution) contained in the solution times the EFL of butyric acid when used alone (0.74 from Example 3) and multiplying the percentage of sorbic acid (6%) contained in the solution times the EFL of sorbic acid when used alone (1.50 from Example 4), then adding these figures together and rounding to two significant figures one obtains an expected EFL of 0.78. Dividing this expected EFL by the EFL observed of 0.26 gives a Synergistic Effect of 300%.

EXAMPLES 1 THROUGH 62

Solutions and dilutions thereof containing solid acids dissolved in volatile fatty acids in various weight-/volume relationships given in the following table are tested to determine their EFl as described above. The results of the test are also given in the following table.

| Example | Feedstuff | % VFA (By Volume of Total VFA) | | | % Solid Acid (Weight per Volume of Total Solution or Dilution) | | EFL Expected (ml./100 g.) | EFL (ml./100 g.) | Synergistic Effect % |
|---|---|---|---|---|---|---|---|---|---|
| | | $C_2$ | $C_3$ | $C_4$ | Sorbic | Dehydro-Acetic | | | |
| 1 | 20% Corn | 100 | — | — | — | — | — | 1.01 | — |
| 2 | 20% Corn | — | 100 | — | — | — | — | 0.81 | — |
| 3 | 20% Corn | — | — | 100 | — | — | — | 0.74 | — |
| 4 | 20% Corn | — | — | — | 100 | — | — | 1.50* | — |
| 5 | 20% Corn | — | — | — | — | 100 | — | 0.70* | — |
| 6 | 20% Wheat | 100 | — | — | — | — | — | 0.94 | — |
| 7 | 20% Wheat | — | 100 | — | — | — | — | 0.69 | — |
| 8 | 20% Wheat | — | — | 100 | — | — | — | 0.60 | — |
| 9 | 20% Wheat | — | — | — | 100 | — | — | 2.00* | — |
| 10 | 20% Wheat | — | — | — | — | 100 | — | 0.70* | — |
| 11 | 20% Wheat | 100 | — | — | 10 | — | 1.05 | 0.52 | 202 |
| 12 | 20% Corn | — | — | 100 | 6 | — | 0.78 | 0.26 | 300 |
| 13 | 20% Corn | — | 100 | — | 8 | 8 | 0.86 | 0.43 | 200 |
| 14 | 20% Corn | — | — | 100 | 6 | 5 | 0.78 | 0.36 | 217 |
| 15 | 20% Corn | 100 | — | — | 10 | 0.98 | 0.52 | 188 | |
| 16 | 20% Corn | — | 100 | — | — | 8 | 0.80 | 0.26 | 308 |
| 17 | 20% Corn | — | — | 100 | — | 5 | 0.74 | 0.52 | 142 |
| 18 | 20% Corn | — | — | 100 | 3 | — | 0.76 | 0.35 | 217 |
| 19 | 20% Corn | 100 | — | — | 5 | — | 1.03 | 0.52 | 198 |
| 20 | 20% Corn | — | 100 | — | 4 | — | 0.84 | 0.52 | 162 |
| 21 | 20% Corn | — | 50 | 50 | 4 | — | 0.80 | 0.42 | 190 |
| 22 | 20% Corn | — | 100 | — | — | 4 | 0.81 | 0.35 | 231 |
| 23 | 20% Corn | 100 | — | — | — | 5 | 0.99 | 0.52 | 190 |
| 24 | 20% Corn | — | — | 100 | — | 2.5 | 0.74 | 0.52 | 142 |
| 25 | 20% Corn | — | 49 | 51 | — | 6.5 | 0.77 | 0.26 | 296 |
| 26 | 20% Corn | — | 100 | — | 4 | 4 | 0.83 | 0.52 | 160 |
| 27 | 20% Corn | — | — | 100 | 3 | 2.5 | 0.76 | 0.52 | 146 |
| 28 | 20% Corn | — | — | 100 | 1.5 | 2.5 | 0.75 | 0.52 | 144 |
| 29 | 20% Corn | — | 49 | 51 | 4 | 2.5 | 0.80 | 0.52 | 154 |
| 30 | 20% Corn | 100 | — | — | 1 | — | 1.01 | 0.70 | 144 |
| 31 | 20% Corn | 100 | — | — | 2 | — | 1.02 | 0.70 | 146 |
| 32 | 20% Corn | 100 | — | — | 3 | — | 1.02 | 0.61 | 167 |
| 33 | 20% Corn | 100 | — | — | 4 | — | 1.03 | 0.43 | 240 |
| 34 | 20% Corn | 100 | — | — | 5 | — | 1.03 | 0.43 | 240 |
| 35 | 20% Corn | — | 100 | — | 1 | — | 0.82 | 0.70 | 117 |
| 36 | 20% Corn | — | 100 | — | 2 | — | 0.82 | 0.52 | 158 |
| 37 | 20% Corn | — | 100 | — | 3 | — | 0.83 | 0.52 | 160 |
| 38 | 20% Corn | — | 100 | — | 4 | — | 0.84 | 0.48 | 175 |
| 39 | 20% Corn | — | 100 | — | 5 | — | 0.84 | 0.43 | 195 |
| 40 | 20% Corn | — | — | 100 | 1 | — | 0.75 | 0.52 | 144 |
| 41 | 20% Corn | — | — | 100 | 2 | — | 0.76 | 0.43 | 177 |
| 42 | 20% Corn | — | — | 100 | 3 | — | 0.76 | 0.35 | 217 |
| 43 | 20% Corn | — | — | 100 | 4 | — | 0.77 | 0.43 | 179 |

-continued

| Example | % VFA (By Volume of Total VFA) Feedstuff | $C_2$ | $C_3$ | $C_4$ | % Solid Acid (Weight per Volume of Total Solution or Dilution) Sorbic | Dehydro-Acetic | EFL Expected (ml./100 g.) | EFL (ml./100 g.) | Synergistic Effect % |
|---|---|---|---|---|---|---|---|---|---|
| 44 | 20% Corn | — | — | 100 | 5 | — | 0.78 | 0.35 | 223 |
| 45 | 20% Corn | 100 | — | — | — | 1 | 1.01 | 0.87 | 116 |
| 46 | 20% Corn | 100 | — | — | — | 2 | 1.00 | 0.78 | 128 |
| 47 | 20% Corn | 100 | — | — | — | 3 | 1.00 | 0.70 | 143 |
| 48 | 20% Corn | 100 | — | — | — | 4 | 1.00 | 0.70 | 141 |
| 49 | 20% Corn | 100 | — | — | — | 5 | 0.99 | 0.56 | 177 |
| 50 | 20% Corn | — | 100 | — | — | 1 | 0.81 | 0.61 | 133 |
| 51 | 20% Corn | — | 100 | — | — | 2 | 0.81 | 0.70 | 116 |
| 52 | 20% Corn | — | 100 | — | — | 3 | 0.81 | 0.43 | 188 |
| 53 | 20% Corn | — | 100 | — | — | 4 | 0.81 | 0.35 | 231 |
| 54 | 20% Corn | — | 100 | — | — | 5 | 0.80 | 0.43 | 186 |
| 55 | 20% Corn | — | — | 100 | — | 0.6 | 0.74 | 0.61 | 121 |
| 56 | 20% Corn | — | — | 100 | — | 0.8 | 0.74 | 0.52 | 142 |
| 57 | 20% Corn | — | — | 100 | — | 1 | 0.74 | 0.43 | 172 |
| 58 | 20% Corn | — | — | 100 | — | 2 | 0.74 | 0.52 | 142 |
| 59 | 20% Corn | — | — | 100 | — | 3 | 0.74 | 0.43 | 172 |
| 60 | 20% Corn | — | — | 100 | — | 4 | 0.74 | 0.43 | 172 |
| 61 | 20% Corn | — | — | 100 | — | 5 | 0.74 | 0.48 | 154 |
| 62 | 20% Corn | 100 | — | — | 10 | — | 1.06 | 0.52 | 204 |

*g./100 g.

To determine whether the improved result is being obtained solely because the solid acid is in solution when applied to the grain, an additional experiment is run in the manner described above using in place of the volatile fatty acid p-dioxane, which is a solvent for both dehydroacetic acid and sorbic acid but has little fungicidal activity of its own. When p-dioxane was added to 20% moisture content corn and wheat its EFL was found to be greater than 0.93 ml. per 100 grams. Dehydroacetic acid and sorbic acid are dissolved in the p-dioxane at a level of 5% weight per volume and the EFL determined for each solution. It was found to still be greater than 0.93 ml. per 100 grams. Thus, it is apparent the enhancement of activity of the volatile fatty acid and the solid acid is not only the result of the formation of a solution but also the result of a true synergistic effect.

In accordance with this invention there are disclosed solutions of solid acids dissolved in volatile fatty acids, which are synergistically efficient fungicides. It is unexpected that the addition of a solid acid improves the effective fungicidal activity of a volatile fatty acid.

Although the invention has been described in considerable detail with particular reference to certain preferred embodiments thereof, variations and modifications can be effected within the spirit and scope of the invention.

We claim:

1. A method for treating animal feedstuffs selected from the group consisting of corn, wheat, oats, soybeans, cottonseed meal, soybean meal, peanuts, barley, rye hay, silage, molasses feed, grain sorghum, safflower seeds, safflower meal, linseed meal, fishmeal, tankage meat and bone meal or scrap, dried blood meal, feather meal, rapeseed and rice by mixing with said feedstuff an effective amount to prevent the growth of mold of a liquid comprising a solution of about 2 to 20% weight per volume of said solution of a mixture of at least one of the acids sorbic and dehydroacetic dissolved in at least one fatty acid selected from the group consisting of acetic, propionic and butyric acids.

2. A method for treating animal feedstuffs selected from the group consisting of corn, wheat, oats, soybeans, cottonseed meal, soybean meal, peanuts, barley, rye hay, silage, molasses feed, grain sorghum, safflower seeds, safflower meal, linseed meal, fishmeal, tankage meat and bone meal or scrap, dried blood meal, feather meal, rapeseed and rice by mixing with said feedstuff an effective amount to prevent the growth of mold of a liquid comprising a solution of about 0.6 to 10% weight per volume of said solution sorbic acid dissolved in at least one fatty acid selected from the group consisting of acetic, propionic and butyric acids.

3. A method for treating animal feedstuffs selected from the group consisting of corn, wheat, oats, soybeans, cottonseed meal, soybean meal, peanuts, barley, rye hay, silage, molasses feed, grain sorghum, safflower seeds, safflower meal, linseed meal, fishmeal, tankage meat and bone meal or scrap, dried blood meal, feather meal, rapeseed and rice by mixing with said feedstuff an effective amount to prevent the growth of mold of a liquid comprising a solution of about 0.6 to 20% weight per volume of said solution dehydroacetic acid dissolved in at least one fatty acid selected from the group consisting of acetic, propionic and butyric acids.

* * * * *